United States Patent
Botelho et al.

(10) Patent No.: US 9,424,185 B1
(45) Date of Patent: Aug. 23, 2016

(54) METHOD AND SYSTEM FOR GARBAGE COLLECTION OF DATA STORAGE SYSTEMS

(71) Applicant: EMC Corporation, Hopkinton, MA (US)

(72) Inventors: Fabiano C. Botelho, Sunnyvale, CA (US); Dheer Moghe, Belmont, CA (US); Guilherme Vale Ferreira Menezes, Santa Clara, CA (US); Nitin Garg, Santa Clara, CA (US); Srikant Varadan, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 388 days.

(21) Appl. No.: 13/909,871

(22) Filed: Jun. 4, 2013

(51) Int. Cl.
G06F 17/30 (2006.01)
G06F 12/02 (2006.01)

(52) U.S. Cl.
CPC .................... G06F 12/0253 (2013.01)

(58) Field of Classification Search
CPC .................................. G06F 12/0253
USPC ................................... 707/813–820
See application file for complete search history.

(56) References Cited

U.S. PATENT DOCUMENTS 8,028,009 B1 * 9/2011 Patterson ............... 707/816
2012/0254267 A1 * 10/2012 Printezis et al. .......... 707/818

OTHER PUBLICATIONS

Belazzougui, Djamal, et al., "Hash, displace, and compress," ESA 2009, 17 pages.
Botelho, Fabiano C., et al., "Practical Perfect Hashing in Nearly Optimal Space," Inf. Syst. 38(1), 2013, 30 pages.

* cited by examiner

*Primary Examiner* — Hares Jami
(74) *Attorney, Agent, or Firm* — Blakely, Sokoloff, Taylor & Zafman LLP

(57) ABSTRACT

A garbage collector of a storage system traverses a namespace of a file system of the storage system to identify segments that are alive in a breadth-first manner. The namespace includes information identifying files that are represented by segments arranged in a plurality of levels in a hierarchy, where an upper level segment includes one or more references to one or more lower level segments, and at least one segment is referenced by multiple files. All live segments of an upper level are identified before any of live segments of a lower level are identified. Upon all live segments of all levels have been identified, the live segments are copied from their original storage locations to a new storage location, and a storage space associated with the original storage locations is reclaimed.

24 Claims, 6 Drawing Sheets

METHOD AND SYSTEM FOR GARBAGE COLLECTION OF DATA STORAGE SYSTEMS

FIELD OF THE INVENTION

Embodiments of the present invention relate generally to data storage systems. More particularly, embodiments of the invention relate to garbage collection of a data storage system.

BACKGROUND

Reclaiming space in de-duplicated file systems is challenging because files are sharing data segments (or data chunks). Each file is seen as sequence of data segments and the segmentation is done using content-based segmentation techniques. The de-duplication unit is a segment that is identified by fingerprints computed on its content using a standard hashing technique (e.g., SHA1 or SHA2). There will be many segments that are packed into data blocks (also referred to as containers). A data block is the storage unit. Therefore, once a file is deleted one can only reclaim space for its data segments if they are not shared with any other file. The question is: how do we efficiently keep track of the segments that are no longer used? This is a totally different problem when compared to a traditional or non de-duplicated file system where each file has its own blocks and once a file is deleted its blocks can be reclaimed right away.

Typically, a storage system includes a garbage collector that deals with the problem of reclaiming space of a deduplicated file system. Garbage collection is a well-known problem for reclaiming internal memory that is not being used anymore. It became fairly popular with the programming language Java. On the context of file systems it has not been so popular until the advent of log-structured file systems. A deduplicated file system, such as Data Domain™ deduplicated file system from EMC® Corporation, is a log-structured file system that implements a mark-and-sweep technique. A mark-and-sweep garbage collection approach consists of two steps: (i) mark all segments being used in the file system as alive; (ii) sweep off all unused segments and free up the space they were taking up.

A conventional garbage collection process is to mark and sweep the segments of files in a depth-first approach, in which each file tree of segments representing a file is traversed from a top level to a bottom level in a file-by-file manner. Some of the segments may be refereed or shared by multiple files. Such an approach may have to repeatedly traverse the same segment or segments for multiple files. As a result, the garbage collection time is proportional to the size of the logical space stored in a deduplicated file system rather than being proportional to the amount of metadata stored in the system. Garbage collection time is very sensitive to the locality of the metadata in the system. Garbage collection time is very sensitive to the number of small files (instead of larger files) stored in the file system. These problems are becoming recurrent as a conventional file system is used for mixed workloads that the original design had not foreseen. Hence it is important to build a garbage collector that is resilient to those problems so the file system can be cleaned in timely fashion.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a garbage collection process is performed based on physical segments of a file system namespace on a breadth-first approach. In the breadth-first approach, the segments are traversed on a level-by-level manner, from a top level (also referred to as a root level or top parent level) to a bottom level, physically instead of on a file-by-file basis. Each segment may be traversed once even through such a segment may be referenced or shared by multiple files. During the traversal of the physical segments, each segment that is deemed to be alive is marked in a live vector (e.g., first vector) indicating that the corresponding segment is alive. Each segment that has been traversed once will be marked in a walk vector (e.g., second vector) indicating that the corresponding segment has been traversed, such that the same segment will not be processed again. After all segments have been scanned or traversed indicated by the walk vector, the live segments (which are indicate by the live vector) may be copied forward from their respective original storage locations to a new storage location. Thereafter, the storage space of the original storage locations of the segments that have been copied forward is reclaimed. Since the garbage collection process is performed on the physical segments directly instead of on a file-by-file basis, the time to perform the garbage collection is not significantly impacted by the fragmentation of the metadata on disk. The more fragmented the metadata is the more costly it is to read segments from the file from disk.

Figure 1:
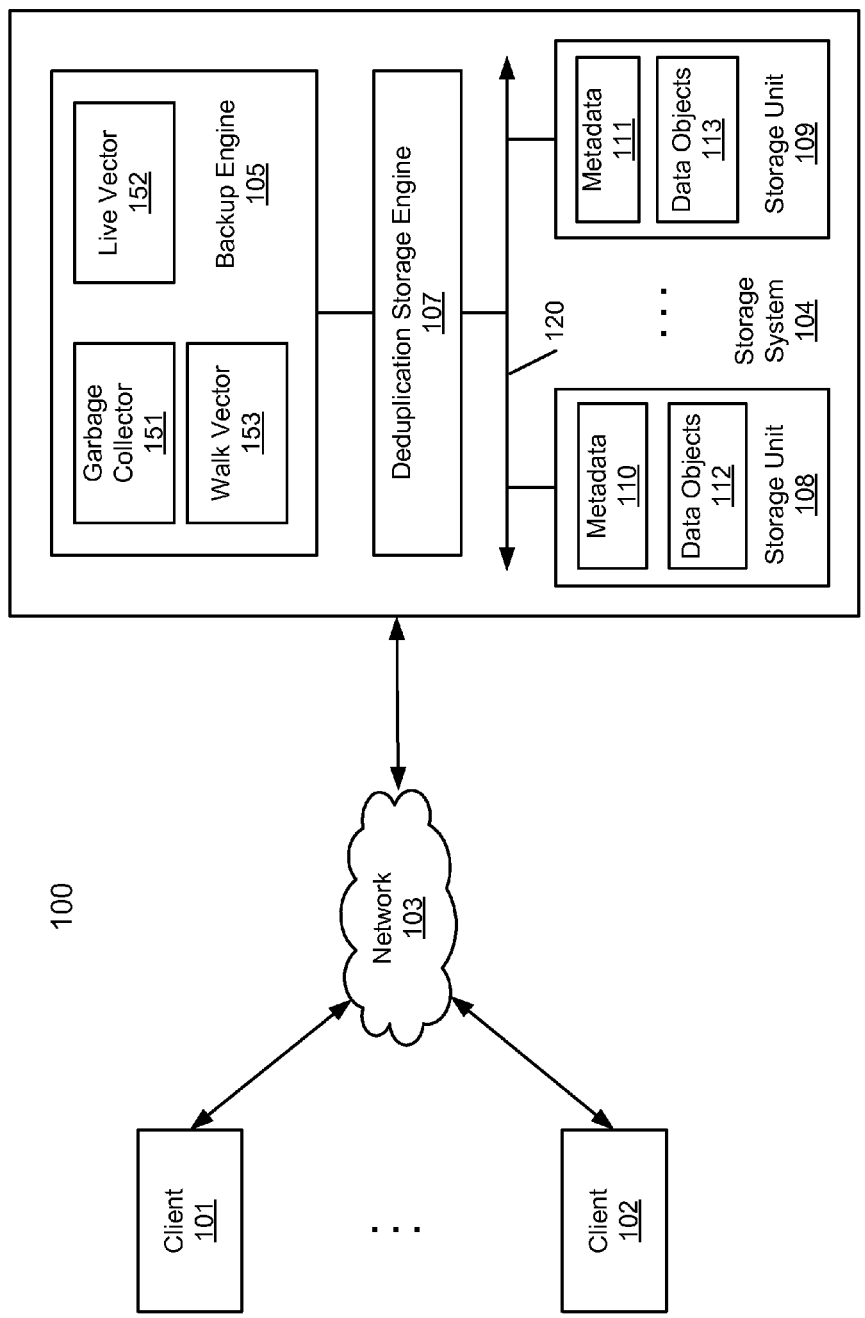
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network.

In response to a data file to be stored in storage units 108-109, deduplication storage engine 107 is configured to segment the data file into multiple segments according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, backup engine 105 includes a garbage collector 151 configured to perform a garbage collection process on storage units or devices 108-109 to reclaim any storage space of segments that have not been referenced or used by any file in the file system. According to some embodiments, garbage collector 151 performs a garbage collection process based on physical segments of a file system namespace on a breadth-first approach. In the breadth-first approach, the segments are traversed on a level-by-level manner, from a top level (also referred to as a root level or top parent level) to a bottom level, physically instead of on a file-by-file basis. Each segment may be traversed once even through such a segment may be referenced or shared by multiple files.

During the traversal of the physical segments, each segment that is deemed to be alive is marked in a live vector 152 (e.g., first vector) indicating that the corresponding segment is alive. Each segment that has been traversed once will be marked in a walk vector 153 (e.g., second vector) indicating that the corresponding segment has been traversed, such that the same segment will not be processed again. After all segments have been scanned or traversed indicated by the walk vector 153, the live segments (which are indicate by the live vector 152) may be copied forward from their respective original storage locations to a new storage location. Thereafter, the storage space of the original storage locations of the segments that have been copied forward is reclaimed. Since the garbage collection process is performed on the physical segments directly instead of on a file-by-file basis, the time to perform the garbage collection is not significantly impacted by the fragmentation of the metadata on disk. The more fragmented the metadata is the more costly it is to read segments from the file from disk.

Figure 2:
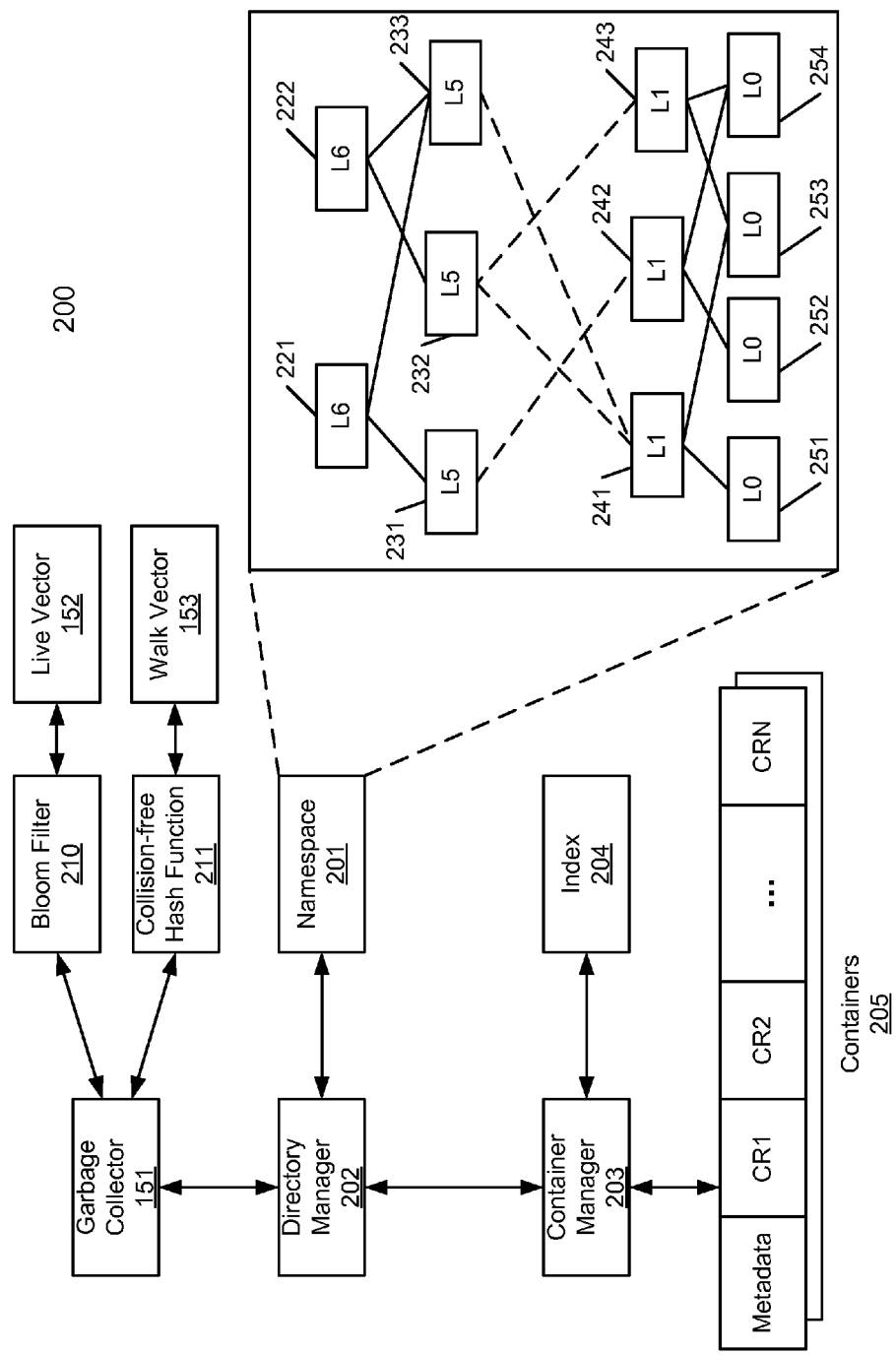
FIG. 2 is a block diagram illustrating a storage system according to one embodiment of the invention.

FIG. 2 is a block diagram illustrating a storage system according to one embodiment of the invention. System 200 may be implemented as part of storage system 104 of FIG. 1. Referring to FIG. 2, garbage collector 151 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as Lp segments.

In one embodiment, when garbage collector 151 traverses namespace 201 via directory manager 202, it obtains fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references.

Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

A conventional garbage collection process typical traverses the segments in a depth-first or a file-by-file manner. For example, assuming segment 221 is associated with a first file while segment 222 is associated with a second file, the garbage collector will have to traverses a first file by scanning segment 221 and then segments 231 and 233, and so on. After the first file has been processed, the garbage collector will process the second file by scanning segment 222 and then segments 232-233, and so on. Thus, segment 233 will be processed at least twice in this example. If there are more files stored in the storage system, there are more segments that will be shared or referenced by multiple files and the processing of the same segments will be repeatedly performed. Thus, the time to perform the garbage collection depends on the size of namespace 201, which depends on the fragmentation of the metadata on disk. The more fragmented the metadata is the more costly it is to read segments from the file from disk.

According to one embodiment, instead of traversing namespace 201 based on a file-by-file basis or a depth-first manner, garbage collector 151 traverses the physical segments in a breadth-first or level-by-level basis. Garbage collector 151 starts with the root level, in this example, L6 segments 221-222. For each of the segments found in namespace 201, regardless which file or files the segment is associated with, live vector 152 is updated or marked to indicate that the corresponding segment is alive. For each of the segments that have been processed, walk vector 153 is updated or marked to indicate that the corresponding segment has been processed so that no repeated process for the same segment will be performed. Once all of the segments of a current level have been processed, segments of a next child level are processed and live vector 152 and walk vector 153 are updated accordingly.

Live vector 152 includes multiple bits, each corresponding to one of the live segments found in namespace 201. Similarly, walk vector 153 includes multiple bits, each corresponding to one of the segments in namespace 201. According to one embodiment, when a live segment is found, the fingerprint or metadata of the live segment is applied to bloom filter 210 which yields one or more of the bits in live vector 152 to be set to a predetermined logical value (e.g., logical value one or zero). A bloom filter is a space-efficient probabilistic data structure that is used to test whether an element is a member of a set. False positive retrieval results are possible, but false negatives are not; i.e. a query returns either "inside set (may be wrong)" or "definitely not in set". Elements can be added to the set, but not removed (though this can be addressed with a counting filter). The more elements that are added to the set, the larger the probability of false positives.

According to one embodiment, when a segment has been processed or traversed, the fingerprint or metadata of the segment is applied to collision-free hash function 211 which yields one of the bits in walk vector 153 to be set to a predetermined logical value (e.g., logical value one or zero). In one embodiment, collision-free hash function 211 is a perfect hash function. A perfect hash function for a set S is a hash function that maps distinct elements in S to a set of integers, with no collisions. A perfect hash function has many of the same applications as other hash functions, but with the advantage that no collision resolution has to be implemented.

In one embodiment, collision-free hash function 211 is generated based on the fingerprints of the segments (e.g., a set of fingerprints) stored in the storage system prior to performing the traversal of the namespace 201. That is, prior to performing any garbage collection, a processing logic such as garbage collector 151 scans all fingerprints of the segments that are involved in the garbage collection to generate a collision-free hash function for those involved segments. If the garbage collection is performed based on a subset of segments (e.g., a range of fingerprints), for each subset, a corresponding collision-free hash function may be specifically generated based on the fingerprints of the segments involved in that particular subset.

According to one embodiment, processing logic such as garbage collector 151 walks through, via directory manager 202, the root level or the most parent level segments, in this example, the L6 segments 221-222 and all the L6 references to walk vector 153 as well as to live vector 152. The root segments 221-222 may be identified based on their content handles, which may be maintained by namespace 201 or the content store (not shown). Based on the content handles, the references (e.g., fingerprints) associated with segments 221-222 may be obtained. Thereafter, the processing logic performs a level-by-level scan of a set of containers that are involved in the garbage collection, which may be a subset of containers or all containers. During the scan for a given level $L_i$ (1≤i≤number of levels, in this example, 6), only containers that contain segments of the $L_i$ level are considered. Once a container having $L_i$ segments is found, processing logic reads content (e.g., metadata and/or data portion) of the container or compression regions containing the $L_i$ segments, checks the walk vector 153 of all the $L_i$ segments and if any is found, adds its references or $L_{i-1}$ segments to the walk vector 153 as well as to the live vector 152. The processing logic scans the $L_{i-1}$ level only if the $L_i$ level has been fully processed. In this example, referring back to FIG. 2, the processing logic will scan segments 221-222 and populates live vector 152 and walk vector 153, before scanning their next child level segments 231-233, and so on.

Figure 3:
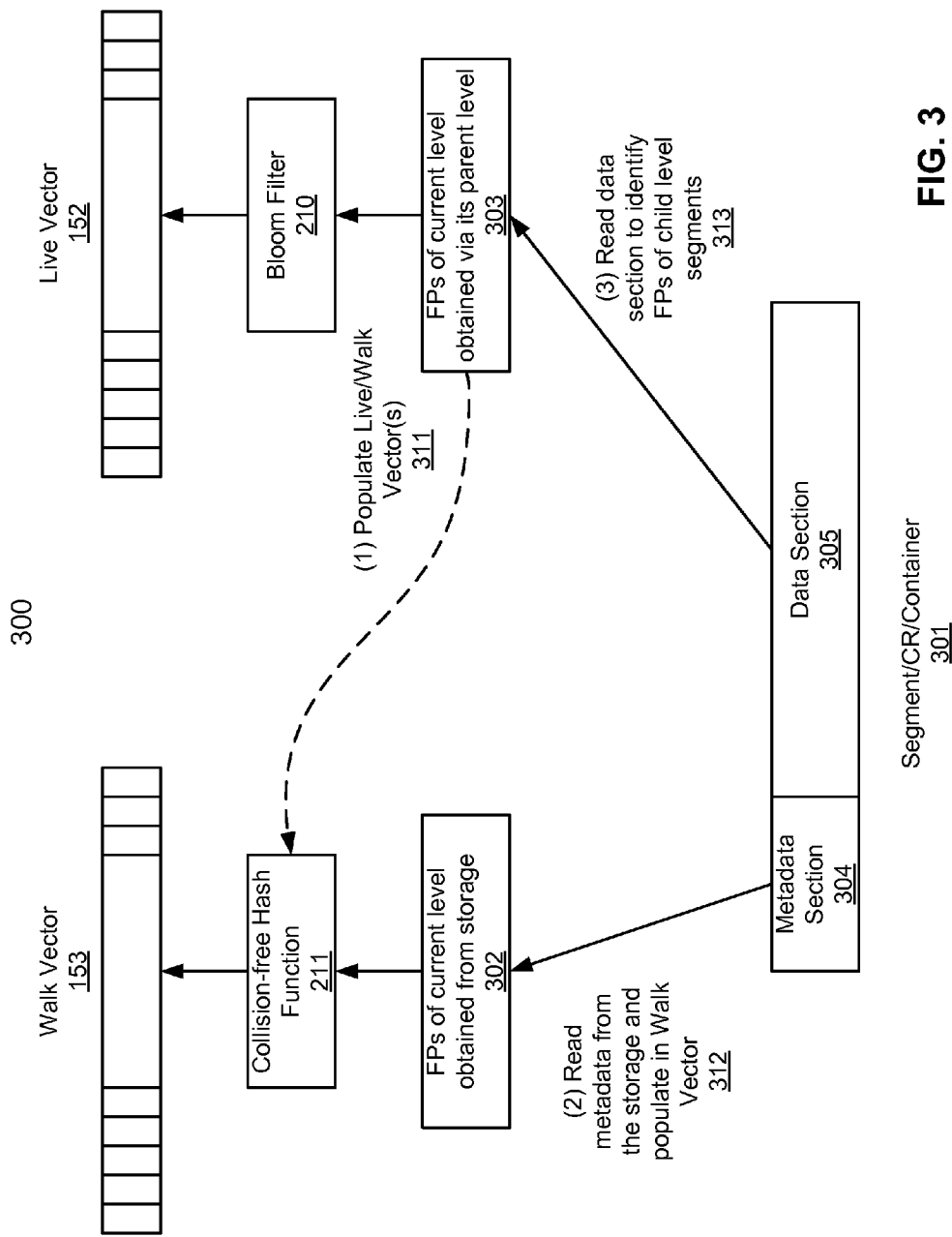
FIG. 3 is a block diagram illustrating a processing flow of traversing a namespace of a file system according to one embodiment of the invention.

FIG. 3 is a block diagram illustrating a processing flow of traversing a namespace of a file system according to one embodiment of the invention. Process 300 may be performed by a system as shown in FIG. 2. Referring to FIG. 3, fingerprint 303 of a current level segment that is obtained from its parent level is populated via path 311 in live vector 152 using bloom filter 210. According to one embodiment, if fingerprints 303 come from LP segments (e.g., segments other than L0 segments), walk vector 153 is also updated. If the current level is the root level (e.g., L6 level), the fingerprint of the current level segment may be obtained via its content handle which may be maintained by the directory manager/namespace and/or the content store.

From the fingerprint of the current level segment, its storage location such as container 301 is identified. In one embodiment, processing logic scans the container manager metadata which may be maintained in memory. For each segment of the type currently scanned for, the processing logic reads its metadata section, determines what CRs to read, and reads those CRs and process the segments therein. Fingerprint 304 of the current level segment is then read from the identified container 301 and populated via path 312 into walk vector 153 using a collision-free hash function 211. Data portion 305 of the current level segment is then retrieved from containers 301 to identify its child level segments (e.g., L5 segments if the current level is L6). The fingerprints of the child level segments are obtained from the data portion 305 of the current level segment via path 313 becoming fingerprints 303. At this point, the child level becomes a current level and the above process is iteratively performed for each of the subsequent levels. Note that FIG. 3 illustrates how a current level segment is processed. All currently level segments have to be processed before any of the child level segments will be processed.

According to one embodiment, prior to populating live vector 152, processing logic may check whether the corresponding segment has already been processed by checking the corresponding bit of walk vector 153. If the segment has been previously processed (e.g., the associated bit has been marked), the process of populating live vector 152 will be ignored. In such a situation, the segment may be referenced or shared by multiple parent level segments, such as segment 233 of FIG. 2. As a result, the efficiency of the traversal process can be improved as each segment will only be processed once.

Figure 4:
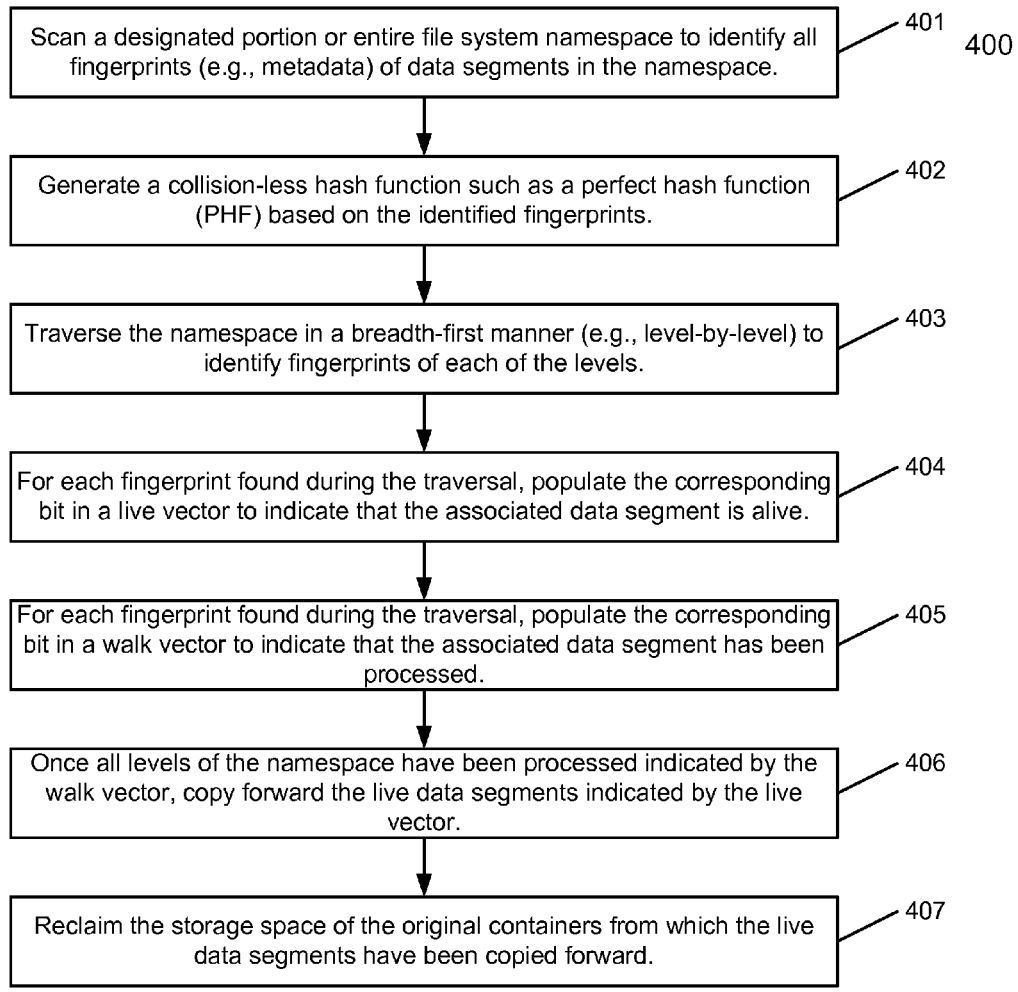
FIG. 4 is a flow diagram illustrating a method of garbage collection of a storage system according to one embodiment of the invention.

FIG. 4 is a flow diagram illustrating a method of garbage collection of a storage system according to one embodiment of the invention. Method 400 may be performed by processing logic which may include hardware, software, or a combination thereof. For example, method 400 may be performed by garbage collector 151 described above. Referring to FIG. 4, at block 401, processing logic scans a designated portion or entire file system namespace to identify all fingerprints (e.g., metadata) of segments that are involved in the garbage collection process. At block 402, based on the fingerprints, a collision-free hash function, such as a perfect hash function, is generated. At block 403, processing logic traverses the namespace in a breadth-first manner (e.g., level-by-level) to identify fingerprints of segments each of the levels. The segments may be identified by physically walking through the segments instead of based on a file-by-file basis.

For each fingerprint found during the traversal, at block 404, processing logic populates a corresponding bit in a live vector, for example, by setting the bit to a predetermined logical value, to indicate that the associated segment is alive. At block 405, for each fingerprint found during the traversal, at block 405, processing logic populates a corresponding bit of a walk vector, for example, by setting the bit to a predetermined logical value, to indicate that the associated segment has been processed. In one embodiment, a bit of live vector is populated for a segment only if the segment has not been processed as indicated by a corresponding bit of the walk vector, such that any particular segment is processed only once. In the example as shown in FIG. 2, according to one embodiment, only fingerprints coming from LPs (e.g., L1 to L6) will be populated in the walk vector. The live vector is populated with both LP and L0 fingerprints. Once fingerprints of all level segments involved have been traversed, which is indicated in the walk vector, at block 406, the live segments that are indicated by the live vector are copied from their original storage locations (e.g., containers) to a new storage location and at block 407, the storage space associated with the original storage locations is reclaimed.

Figure 5:
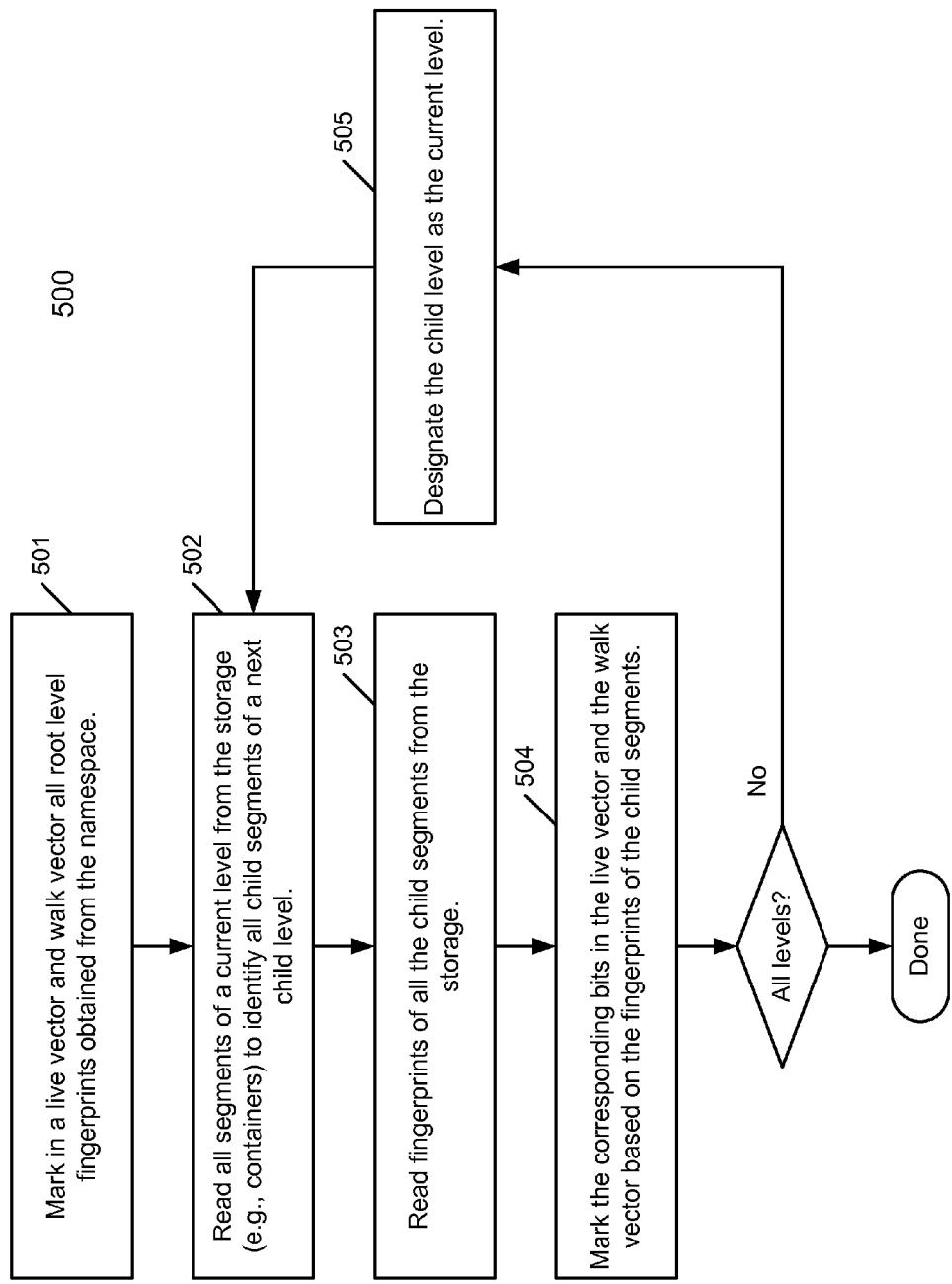
FIG. 5 is a flow diagram illustrating a method of garbage collection of a storage system according to another embodiment of the invention.

FIG. 5 is a flow diagram illustrating a method of garbage collection of a storage system according to another embodiment of the invention. Method 500 may be performed by processing logic which may include hardware, software, or a combination thereof. For example, method 500 may be performed as part of blocks 403-405 of FIG. 4. Referring to FIG. 5, at block 501, processing logic marks in a live vector and a walk vector based on fingerprints of all root level segments that are involved in the current garbage collection process. The fingerprints of the root level segments may be obtained from the namespace or content store. Based on the fingerprints of the current level segments, at block 502, processing logic retrieves all segments of the current level from the storage to identify all child segments of the next child level. At block 503, processing logic retrieves fingerprints of the child level segments from the storage and at block 504, the live vector and the walk vector are populated based on the fingerprints of the child level segments. If there are more child levels, at block 505, the child level is designated as the current level and the above process is iteratively performed.

According to one embodiment, the garbage collection process can be performed in multiple phases. The first phase is referred to as a pre-merge phase, in which the in-memory fingerprint-to-container index (e.g., index 204) is merged with the index stored in the disk. It may force an index merge with the on-disk portion of the index. It was also modified to create some markers to ensure that a fingerprint that is outside the set of fingerprints used to construct the perfect hash vector (walk vector) is never used for neither lookup nor insertion in the walk vector. The next phase is referred to as a pre-analysis phase, in which a perfect hash vector (walk vector) is generated for all the Lp segments in the system. It also determines the sampling rate that should be used based on the number of fingerprints in the system. The next phase is referred to as a pre-enumeration phase, in which traverse algorithm, as shown in FIGS. 4-5 and described above, is performed and sampling may be applied if needed while inserting fingerprints to the live vector.

The next phase is referred to as a pre-filter phase, in which processing logic iterates through the fingerprint index and selects which instance of a given fingerprint should be preserved. The current policy is to preserve the most recently written copy of a fingerprint (i.e., the one stored in the latest container ID). The output of the phase is a bloom filter referred to as the live instance vector. The next phase is referred to as a pre-select phase, in which the processing logic iterates through the containers, and uses the live instance vector to estimate the percentage of the live data in each container. The processing logic also calculates the cleaning criteria/thresholds, and marks a container as candidate for cleaning if it meets the cleaning criteria. In one embodiment, a container having certain amount of live segments that is above a predetermined threshold may be considered as a candidate for cleaning. The next phase is referred to as a merge phase in which the same process as the pre-merge phase is performed but later in time. It is only executed when sampling is required; otherwise this phase can be skipped. The next phase is referred to as an analysis phase, in which the same process as the pre-analysis phase is performed but later in time. It is only executed when sampling is required; otherwise this phase can be skipped.

The next phase is referred to as a candidate phase, in which processing logic iterates all containers marked in the pre-select phase, and generates a bloom filter referred to as candidate vector with all the fingerprints in the candidate containers. The next phase is referred to as an enumeration phase, in which the same process as the pre-enumeration phase is performed but later in time. It also uses the candidates to filter against rather than the sampling mask as it happens in the pre-enumeration phase. It is only executed when sampling is required; otherwise this phase can be skipped. The next phase is referred to as a filter phase, in which the same process as pre-filter phase is performed but later in time. It is only executed when sampling is required; otherwise this phase can be skipped. The final phase is referred to a copy phase, in which processing logic copies all the candidate containers forward and use the live instance vector to filter the segments that are being copied.

Figure 6:
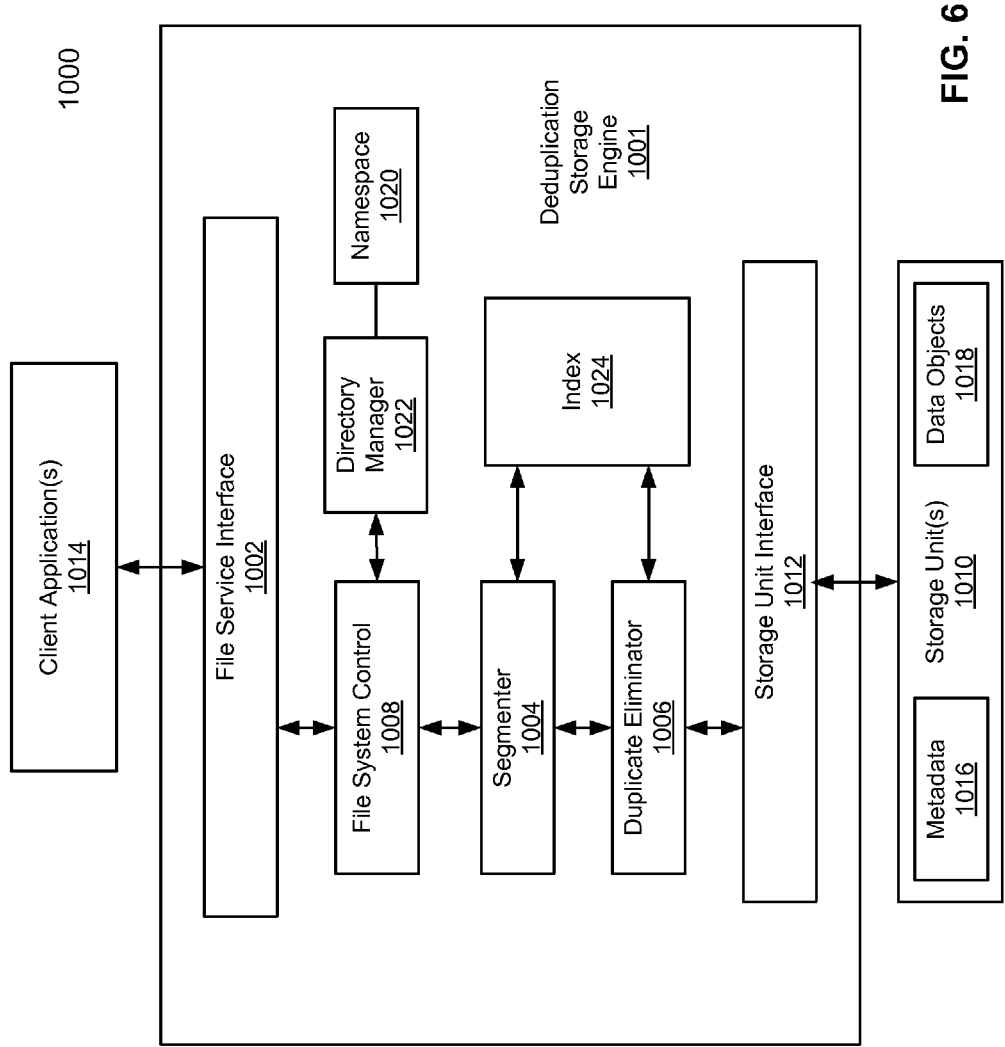
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as, for example, the deduplication storage system as shown in FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data segment, a compression region (CR) of data segments, or a container of one or more CRs. Fingerprints are mapped to a particular data object via metadata 1016, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008, also referred to as a file system manager, processes information to indicate the segment(s) association with a file. In some embodiments, a list of fingerprints is used to indicate segment(s) associated with a file. File system control 1008 passes segment association information (e.g., representative data such as a fingerprint) to index 1024. Index 1024 is used to locate stored segments in storage units 1010 via storage unit interface 1012. Duplicate eliminator 1006, also referred to as a segment store, identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (which may be implemented as part of storage unit interface 1012) into one or more storage containers stored in storage units 1010. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates (e.g., via segmenter 1004) with index 1024 to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree obtained from namespace 1020) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for garbage collection, the method comprising:
    traversing, by a garbage collector executed by a processor, a namespace of a file system of a storage system to identify segments that are alive in a breadth-first manner, the namespace identifying a plurality of files that are represented by a plurality of trees of segments arranged in a plurality of levels in a hierarchy, each tree of segments having a root node that represents one of the plurality of files, wherein an upper level segment includes one or more references to one or more lower level segments, wherein at least one segment is referenced by multiple segments of multiple trees representing multiple files, and wherein all live segments of an upper level are identified before any of live segments of a lower level are identified, wherein each of the segments of the trees is traversed only once to determine whether the segment is a live segment;
    upon all live segments of all levels have been identified, copying the live segments from their original storage locations to a new storage location; and
    reclaiming a storage space associated with the original storage locations of the persistent storage device.

2. The method of claim 1, wherein traversing a namespace of a file system comprises:
    for each of the levels in the hierarchy, iteratively performing the following:
        obtaining fingerprints of all segments of a current level; and
        for each of the fingerprints of the current level, marking a corresponding bit of a live vector to indicate that a corresponding segment is alive, wherein the live vector includes a plurality of bits, each bit corresponding to one of the segments in the namespace.

3. The method of claim 2, wherein marking a corresponding bit of a live vector comprises applying a bloom filter to the corresponding fingerprint which results in one or more of a plurality of bits of live vector.

4. The method of claim 2, further comprising:
    for each of the segments of the current level, retrieving a fingerprint of the segment from its storage location of a storage device; and
    marking a corresponding bit of a walk vector to indicate that the segment has been processed for a purpose of garbage collection.

5. The method of claim 4, wherein marking a corresponding bit of a walk vector comprises applying a collision-free hash function to the fingerprint of the segment which results in one of the bits in the walk vector.

6. The method of claim 5, wherein the collision-free hash function is a perfect hash function that is generated based on all fingerprints of all segments stored in the storage system.

7. The method of claim 4, further comprising:
    retrieving a data portion of the segment of the current level from the storage;
    identifying one or more child segments of a child level with respect to the current level; and
    determining whether the child segments are alive after all segments of the current level have been processed in the live vector and the walk vector.

8. The method of claim 7, wherein segments indicated by the live vector are copied to the new storage location after all bits of the walk vector have been marked.

9. A non-transitory machine-readable medium having instructions stored therein, which when executed by a processor, cause the processor to perform operations of garbage collection, the operations comprising:
    traversing a namespace of a file system of a storage system to identify segments that are alive in a breadth-first manner, the namespace identifying a plurality of files that are represented by a plurality of trees of segments arranged in a plurality of levels in a hierarchy, each tree of segments having a root node that represents one of the plurality of files, wherein an upper level segment includes one or more references to one or more lower level segments, wherein at least one segment is referenced by multiple segments of multiple trees representing multiple files, and wherein all live segments of an upper level are identified before any of live segments of a lower level are identified, wherein each of the segments of the trees is traversed only once to determine whether the segment is a live segment;
    upon all live segments of all levels have been identified, copying the live segments from their original storage locations to a new storage location; and
    reclaiming a storage space associated with the original storage locations of the persistent storage device.

10. The medium of claim 9, wherein traversing a namespace of a file system comprises:
    for each of the levels in the hierarchy, iteratively performing the following:
        obtaining fingerprints of all segments of a current level; and
        for each of the fingerprints of the current level, marking a corresponding bit of a live vector to indicate that a corresponding segment is alive, wherein the live vector includes a plurality of bits, each bit corresponding to one of the segments in the namespace.

11. The medium of claim 10, wherein marking a corresponding bit of a live vector comprises applying a bloom filter to the corresponding fingerprint which results in one or more of a plurality of bits of live vector.

12. The medium of claim 10, wherein the operations further comprise:
    for each of the segments of the current level, retrieving a fingerprint of the segment from its storage location of a storage device; and
    marking a corresponding bit of a walk vector to indicate that the segment has been processed for a purpose of garbage collection.

13. The medium of claim 12, wherein marking a corresponding bit of a walk vector comprises applying a collision-free hash function to the fingerprint of the segment which results in one of the bits in the walk vector.

14. The medium of claim 13, wherein the collision-free hash function is a perfect hash function that is generated based on all fingerprints of all segments stored in the storage system.

15. The medium of claim 12, wherein the operations further comprise:
    retrieving a data portion of the segment of the current level from the storage;
    identifying one or more child segments of a child level with respect to the current level; and
    determining whether the child segments are alive after all segments of the current level have been processed in the live vector and the walk vector.

16. The medium of claim 7, wherein segments indicated by the live vector are copied to the new storage location after all bits of the walk vector have been marked.

17. A data storage system, comprising:
a processor; and
a memory coupled to the processor for storing instructions which when executed from the memory, cause the processor to
traverse a namespace of a file system of the data storage system to identify segments that are alive in a breadth-first manner, the namespace identifying a plurality of files that are represented by a plurality of trees of segments arranged in a plurality of levels in a hierarchy, each tree of segments having a root node that represents one of the plurality of files, wherein an upper level segment includes one or more references to one or more lower level segments, wherein at least one segment is referenced by multiple segments of multiple trees representing multiple files, and wherein all live segments of an upper level are identified before any of live segments of a lower level are identified, wherein each of the segments of the trees is traversed only once to determine whether the segment is a live segment,
upon all live segments of all levels have been identified, copy the live segments from their original storage locations to a new storage location, and
reclaim a storage space associated with the original storage locations of the persistent storage device.

18. The system of claim 17, wherein traversing a namespace of a file system comprises:
for each of the levels in the hierarchy, iteratively performing the following:
obtaining fingerprints of all segments of a current level; and
for each of the fingerprints of the current level, marking a corresponding bit of a live vector to indicate that a corresponding segment is alive, wherein the live vector includes a plurality of bits, each bit corresponding to one of the segments in the namespace.

19. The system of claim 18, wherein marking a corresponding bit of a live vector comprises applying a bloom filter to the corresponding fingerprint which results in one or more of a plurality of bits of live vector.

20. The system of claim 18, wherein for each of the segments of the current level, a fingerprint of the segment is retrieved from its storage location of a storage device, and wherein a corresponding bit of a walk vector marked to indicate that the segment has been processed for a purpose of garbage collection.

21. The system of claim 20, wherein marking a corresponding bit of a walk vector comprises applying a collision-free hash function to the fingerprint of the segment which results in one of the bits in the walk vector.

22. The system of claim 21, wherein the collision-free hash function is a perfect hash function that is generated based on all fingerprints of all segments stored in the storage system.

23. The system of claim 20, wherein the processor is configured further to retrieve a data portion of the segment of the current level from the storage,
identify one or more child segments of a child level with respect to the current level, and
determine whether the child segments are alive after all segments of the current level have been processed in the live vector and the walk vector.

24. The system of claim 23, wherein segments indicated by the live vector are copied to the new storage location after all bits of the walk vector have been marked.

* * * * *